UNITED STATES PATENT OFFICE.

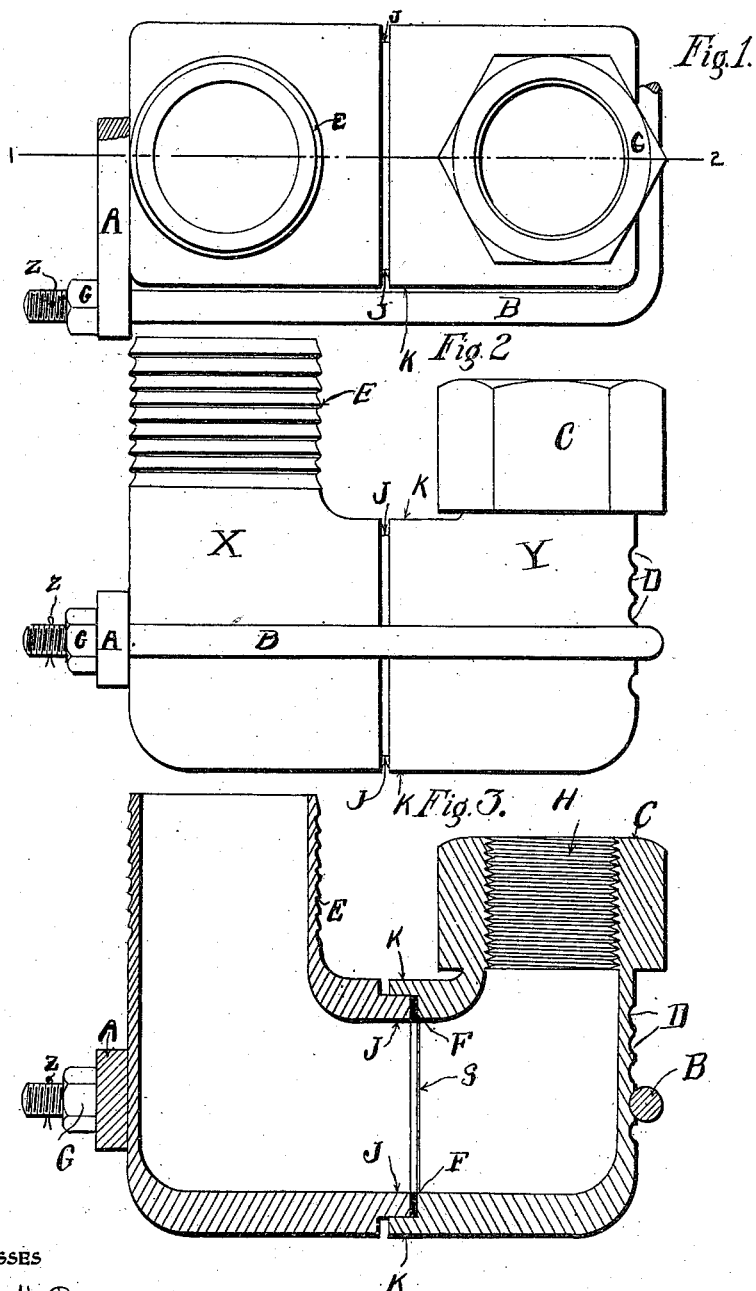

JOHN M. REITER AND HARRY L. DOUT, OF MISSOULA, MONTANA.

WATER AND STEAM COUPLING.

987,490.  Specification of Letters Patent.  Patented Mar. 21, 1911.

Application filed October 18, 1909. Serial No. 523,247.

*To all whom it may concern:*

Be it known that we, JOHN M. REITER and HARRY L. DOUT, citizens of the United States, residing at Missoula, in the county of Missoula and State of Montana, have invented a new and useful Steam and Water Coupling, of which the following is a specification.

Our invention relates to improvements in water and steam couplers in which the female and male ends of two pipes are bound together by means of a U shaped bolt, a plate of wrought iron and two hexagon nuts a rubber gasket being placed between the male and female ends.

The objects of our improvements are first, to provide for a water and steam tight joint in which the union and its accompanying screw threads are eliminated; second, to afford facilities for the proper adjustment of the joint so as to make it absolutely steam and water tight. We attain these objects by the mechanism illustrated in the accompanying drawing in which—

Figure 1 is a top view of the entire machine with a portion of the U bolt, a portion of the plate and one hexagon nut removed; Fig. 2, an elevation of the machine; Fig. 3, a vertical section of the entire machine on the line 1 2.

Similar letters refer to similar parts throughout the several views.

The male end of the pipe J J fits into the female end of the pipe K K into which is previously inserted the rubber gasket F F and the joint is held together by means of the U shaped bolt B, the plate A and the hexagon nuts G and is tightened so as to make it water and steam tight by tightening these nuts G. The bolt B is held securely in place and prevented from slipping by means of the grooves D D; the corrugations E running entirely around the pipe X are provided so as to facilitate slipping on a hose and prevent its slipping off; the hexagon nut C is a part of the pipe Y and is provided with screw threads that it may be adjusted to a steam or water pipe before the joint is made. The screen S is adjusted between the male and the female ends of the pipe in such a manner as to be removed for cleaning purposes, or to be removed in case of breaking; Z is a cotter inserted in a hole drilled in the threaded end of the bolt B to prevent the nuts from coming off.

We are aware that previous to our invention couplings for steam and water pipes have been used. We therefore do not claim such a combination broadly; but

We claim—

A pipe coupler of the class set forth comprising a pair of substantially L-shaped members, each of said members being circular in cross section, one of said members having an exteriorly threaded serrated portion adapted for the reception of a hose, the opposite face of the said member having an annular reduced portion adjacent its end, the second member having its co-acting face provided with an interior cut-away portion adapted to engage with the reduced portion of the first named member, a washer between both of these members, the second member being formed with an offset, the offset portion of the second member being provided with interior threads, the outer wall of the said second member being further provided with a plurality of corrugations, a bail straddling both of the members and having its connecting end engaged within any of the corrugations, a plate having openings engaging the arms of the bail and positioned against the first named member, the said arms of the bail being threaded, and nuts engaging the said threads and adapted to force the bail tightly into engagement with any one of the corrugations of the second member so that both of the members will be rigidly secured together.

JOHN M. REITER.
HARRY L. DOUT.

Witnesses:
JAMES H. BONNER,
T. E. FITZ GERALD.

---

Copies of this patent may be obtained for five cents each, by addressing the "Commissioner of Patents Washington, D. C."